United States Patent [19]

Bethany et al.

[11] 3,900,723

[45] Aug. 19, 1975

[54] APPARATUS FOR CONTROLLING COMPUTER PIPELINES FOR ARITHMETIC OPERATIONS ON VECTORS

[75] Inventors: Lewis R. Bethany, St. Paul; Daniel J. Desmonds, Roseville; Donald P. Tate, St. Paul, all of Minn.

[73] Assignee: Control Data Corporation, Minneapolis, Minn.

[22] Filed: May 28, 1974

[21] Appl. No.: 473,652

[52] U.S. Cl. .................................. 235/156; 235/168

[51] Int. Cl.[2] ............................................. G06F 7/38

[58] Field of Search ........... 235/156, 159, 160, 164, 235/165, 168

[56] References Cited

UNITED STATES PATENTS

| | | | |
|---|---|---|---|
| 3,331,954 | 7/1967 | Kinzie et al. | 235/156 |
| 3,564,226 | 2/1971 | Seligman | 235/164 |
| 3,697,734 | 10/1972 | Booth et al. | 235/164 |
| 3,758,767 | 9/1973 | Kantorovich et al. | 235/159 |
| 3,760,171 | 9/1973 | Wang et al. | 235/156 |

*Primary Examiner*—David H. Malzahn
*Attorney, Agent, or Firm*—Robert M. Angus

[57] ABSTRACT

Apparatus is provided for controlling the arithmetic units of a computer pipeline to accomplish arithmetic operations on operands of a plurality of operand vectors to derive resultants. The apparatus includes a plurality of gates connected to the pipeline, at least one gate being provided for each operand vector being inputted to the pipeline and at least one gate being provided at the output of the pipeline. The gates are selectively operated to selectively channel data to the computer pipeline, the data being channelled being either the pipeline outputs, or operands from the operand vector, or data representative of machine zero. One form of the disclosure resides in the provision of a plurality of similar pipelines each having input and output gates with the output gate from one pipeline being connected to at least one input gate of another pipeline.

4 Claims, 1 Drawing Figure

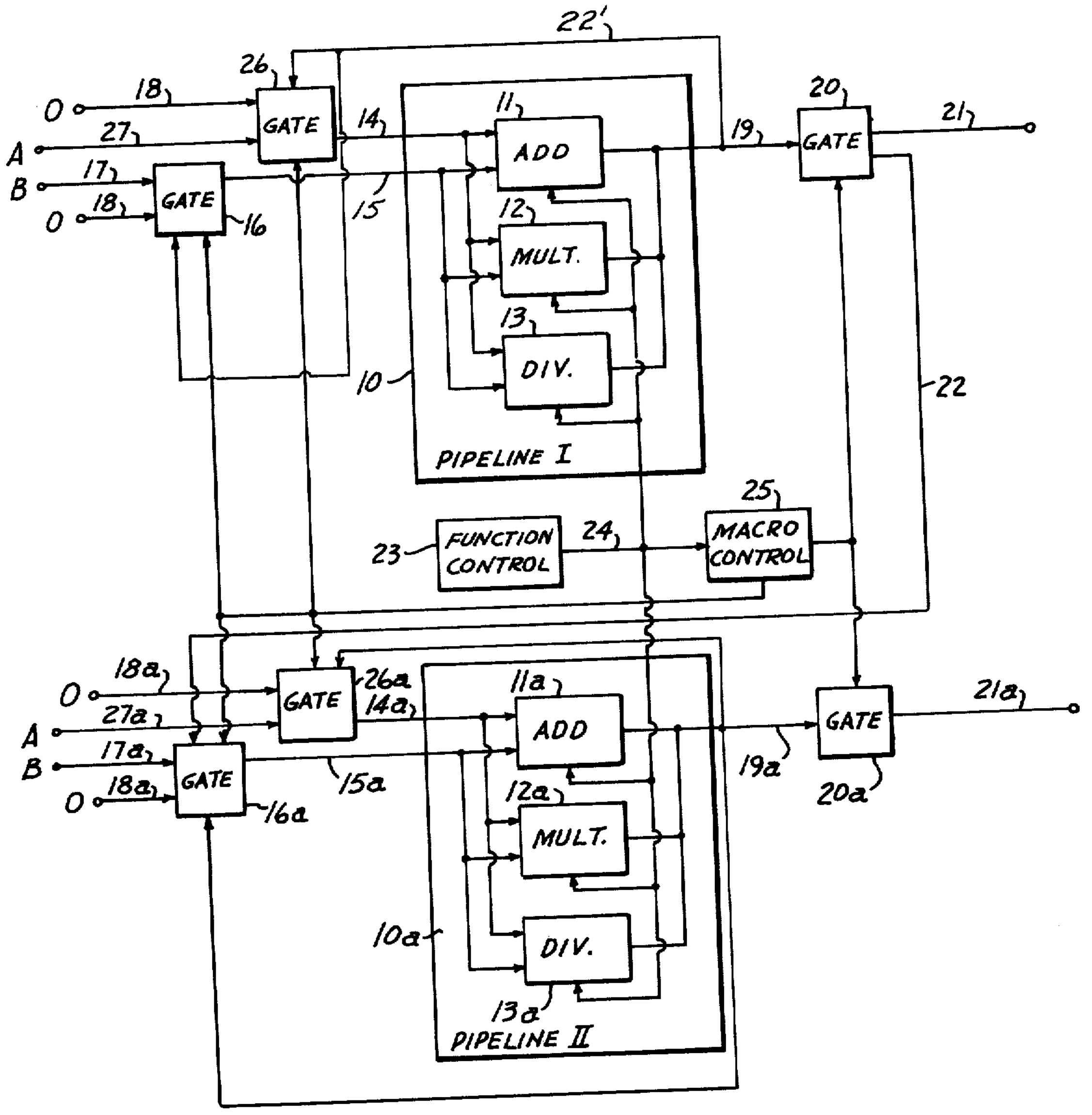
22'
26
18
0
GATE
14
11
ADD
20
GATE
21
A
27
19
B
17
GATE
15
0
18
16
12
MULT.
13
DIV.
10
22
PIPELINE I
25
23
FUNCTION CONTROL
24
MACRO CONTROL
18a
0
GATE
26a
14a
11a
ADD
GATE
21a
A
27a
B
17a
GATE
15a
19a
20a
0
18a
16a
12a
MULT.
10a
DIV.
13a
PIPELINE II

APPARATUS FOR CONTROLLING COMPUTER PIPELINES FOR ARITHMETIC OPERATIONS ON VECTORS

This invention relates to data processing, particularly to selective operation of arithmetic units to handle vectors in an optimum configuration.

In the copending application of M. L. Hutson and L. R. Bethany, Ser. No. 450,632 filed Mar. 13, 1974 for "Data Processing Apparatus" there is described apparatus for aligning individual operands of a plurality of operand vectors for subsequent operation in an arithmetic unit of a computer. As explained in the aforementioned copending application of Hutson and Bethany, operand vectors are continuously streamed in such a manner as to obtain operands from at least two operand vectors in an optimum manner so that both operand vectors are continuously streamed to the arithmetic unit. In the copending application of M. L. Hutson and K. Erben, Ser. No. 470,896 filed May 17, 1974 for "Data Processing System", there is described a refinement of the aforementioned Hutson and Bethany apparatus, wherein sparse vectors may be streamed to the data processing and arithmetic portions of the computer in an optimum fashion. The present invention is directed particularly to control apparatus for controlling the arithmetic units to obtain optimum control of operands of a vector (whether it be an operand vector or a sparse vector) to most efficiently obtain resultants.

As explained in the aforementioned application of Hutson and Bethany, an operand vector comprises a plurality of operands in consecutive order. Thus, an A operand will consist of $A_1, A_2, A_3, A_4 \ldots A_n$ whereas a B operand vector will comprise $B_1, B_2, B_3, B_4 \ldots B_m$, where $A_1, A_2, A_3$, etc. and $B_1, B_2, B_3$, etc. are individual operands of a vector. As explained in the aforementioned Hutson and Bethany application, the operands may be aligned by a buffer streaming apparatus as described therein so as to sequentially issue $A_1$ and $B_1$, $A_2$ and $B_2$, $A_3$ and $B_3$, etc. As explained in the aforementioned Hutson and Erben application, certain ones of the operands may be ommitted (by virtue of their representing a predetermined value, such as zero), so that the buffer stream apparatus will issue a machine zero together with individual operands for subsequent operation, thereby aligning corresponding operands of each vector.

The arithmetic operation on such operands is ordinarily controlled by a function control designed to perform some arithmetic function on the individual operands of the vectors. For example, in a "sum A vector", the individual operands of the A operand vector are summed (added) to derive a C resultant. Thus, such an operation would accomplish $A_1+A_2+A_3+A_4 \ldots =C$. In a dot product operation wherein the sum of the products of the $A$ operand vectors and of the B operand vectors is to be determined, the arithmetic apparatus will accomplish $A_1 . B_1+A_2 . B_2+A_3 . B_3 \ldots +A_n . B_m=C$. In an "interval" operation, the arithmetic unit will accomplish $A_1=C_1$, $A_1+B_1=C_2$, $A_1+2B_1=C_3$, $A_1+3B_1=C_4 \ldots A_1+(n-1)B_1=C_n$.

As explained in the aforementioned application of Hutson and Bethany and of Hutson and Erben, the operands may be streamed to the arithmetic unit at a rate significantly higher than the processing capabilities of the arithmetic unit. The present invention is directed to apparatus for controlling the arithmetic unit to accept the operand vectors at a predetermined rate (such as dictated by the streaming unit) and to selectively accomplish arithmetic operations on the vectors, or portions thereof, to form resultants.

Particularly, it is an object of the present invention to provide control apparatus for controlling the arithmetic operation of a computer for handling vectors in an optimum fashion.

It is another object of the present invention to provide apparatus for controlling the arithmetic operation in a computer pipeline wherein the individual operands are successively moved through a pipleine and manipulated in a fashion controlled by a controller in accordance with the function to be accomplished so that the arithmetic unit may receive operands in accordance with the machine capability and issue resultants in a similar fashion.

According to the present invention, a pipline consists of a plurality of arithmetic units, such as add, multiply and divide units, and receives, as one input, one of the operand vectors, and, as a second input, another operand vector. Gate means is provided at the output for selectively gating the output of the pipeline to stream the result back to memory, or to the pipeline input, or to a second pipeline for subsequent operation. Control means is provided for selectively operating various gates of the pipeline so that the pipeline may receive successive operands of one or both vectors and manipulate those operands to derive results, or partial results, as the case may be.

One feature of the present invention resides in the provision of control apparatus for selectively controlling the gates to manipulate the operands in a predetermined fashion, as determined by a function control.

The above and other features of this invention will be more fully understood from the following detailed description and the accompanying drawing, in which the sole figure is a block circuit diagram of the presently preferred embodiment of the present invention.

Referring to the drawing, there is illustrated control apparatus in accordance with the presently preferred embodiment of the present invention. The control apparatus includes a first pipeline 10 having add apparatus 11, multiply apparatus 12 and divide apparatus 13. It is to be understood that other arithmetic units may be included in the pipeline, and the three are shown for purposes of explanation and not of limitation. Each arithmetic unit within pipeline 10 receives inputs via channels 14 and 15. As shown particularly in the drawing, channel 14 receives an input from gate 26 whereas channel 15 receives an input from gate 16. Gate 16 has a first input 17 representative of the B operand and a second input 18 representative of machine zero, and gate 26 receives an input representative of the A operand via channel 27 and machine zero via channel 18. From each of the arithmetic units within pipeline 10 there is an output 19 which is applied to gates 20, 26 and 16. Gate 20 provides an output via channel 21 which may, for example, return to the buffer streaming as explained in the aforementioned Hutson and Bethany application.

A second pipeline 10*a* is shown containing add circuits 11*a*, multiply circuits 12*a* and divide circuits 13a. Each of circuits 11*a*, 12*a* and 13*a* receive inputs via channels 14*a* and 15*a*, channel 14*a* receiving inputs from gate 26*a* (having a channel 27*a* receiving the A operand vector) and channel 15*a* receiving an input from gate 16*a*. Gate 16*a* receives a first input via channel 17*a* from the B operand vector. Gates 16*a* and 26*a* each receive a second input via channel 18*a* representative of machine zero. The output from pipeline 10*a* is taken via channel 19*a* to gates 16*a*, 20*a* and 26*a*. Gate 20*a* provides an output via channel 21*a* to the buffer described in the aforementioned Hutson and Bethany application. The lower pipeline 10*a* and its associated gates 16*a*, 20*a* and 26*a* are identical to the upper pipeline 10 and its associated gates 16, 20 and 26. However, as shown in the drawing, the output from gate 20 taken via channel 22 is applied to gate 16*a* for purposes to be hereinafter explained.

Function control 23 provides an output via channel 24 to the add, multiply and divide circuits 10 and 10*a*, and to macro control 25. Macro control 25 provides outputs to gates 16 and 16*a*, 20 and 20*a*, and 26 and 26*a*.

The operation of the apparatus may best be explained by describing various functions accomplished by the apparatus.

SUM

A sum operation on a vector is an operation to obtain the sum of all operands of the vector. Thus, to sum the A operand vector, each operand of the vector is summed to derive $C=A_1+A_2+A_3+A_4 \ldots +A_n$. To accomplish this function, the A operands ($A_1, A_2, A_3 \ldots A_n$) are continuously streamed into pipeline 10 via channel 14. Function control 23 is set to provide an output via channel 24 indicative of a sum operation, such output gating add circuit 11 in pipeline 10 and macro control 25. Macro control 25 will gate gates 16, 20 and 26 as hereinafter explained.

Assume that add circuit 11 is designed to accomplish a sum function at a rate one-half that of the rate of input streaming of the A operands. (Obviously, other arithmetic rates may be provided, as will become more apparent hereinafter.) During the first iteration of the operation, macro control 25 gates gate 16 to supply a machine zero output via channel 15 to add circuit 11. Therefore, $A_1$ is inputted to gate 26 and enters circuit 11 and an add function is commenced to accomplish $A_1+0$. Likewise, during the second iteration, $A_2$ is added to zero to accomplish $A_2+0$. During the next iteration, the output ($A_1+0$) from pipeline 10 is gated through gate 16. Thus, during the third iteration when $A_3$ is passed by gate 26, the sum of $0+A_1+A_3$ is commenced. During the fourth iteration, $O+A_2$ is passed through gate 16 while gate 26 passes $A_4$ so that the sum of $O+A_2+A_4$ is commenced. The process continues until two partial resultants are accomplished:

$$O+A\ 1+A_3+A_5+A_7 \ldots A_n, \text{ and}$$

$$O+A_2+A_4+A_6+A_8 \ldots A_{n-1},$$

where $n$ is an odd integer. (If $n$ is even, the partial resultants are:

$0+A_1+A_3+A_5+A_7 \ldots A_{n-1}$, and $O+A\ 2+A_4+A_6+A_8 \ldots A_n$.)

The partial resultants are continuously recirculated through gates 16 and 26 until it is determined that no further A operands are arriving and that two partial resultants have been accomplished. Thereafter, gate 20 is gated to supply the earliest partial resultant via channel 21 to a register file (not shown) which is then returned to gate 16 via channel 17. The later partial resultant is returned to gate 26 via channel 22'. The two partial resultants are then added and the final resultant is forwarded via channel 21 back to the buffer apparatus, such as that described in the aforementioned Hutson and Bethany application.

DOT PRODUCT

A dot product operation is an operation designed to obtain the sum of the products of corresponding operands of a plurality (e.g. two) operand vectors. Thus, in a dot product operation, the following resultant is obtained:

$$A_1 . B_1+A_2 . B_2+A_3 . B_3 \ldots +A_n . B_m=C$$

To accomplish this function, the $A$ and $B$ operands are continuously streamed into pipeline 10 via gates 16 and 26 and are multiplied by multiplier circuit 12. In this regard, function control 23 operates multiplier 12 to accomplish $A_1 . B_1$, $A_2 . B_2$, $A_3 . B_3 \ldots$ and $A_n . B_m$. It will be appreciated that multiplier 12 may be slower than the rate of incoming operands, but since multiplier 12 is capable of performing multiply operations on several successive operands at the same time, the partial resultants will be supplied to gate 20 at the input rate. For further details of the multipler, reference may be had to U.S. Pat. No. 3,814,924 granted June 4, 1974 for "Pipeline Binary Multiplier" to D. P. Tate. Gate 20 is operated by control 25 to provide successive partial resultants via channel 22 to gate 16*a*. Function control 23 controls adder 11a in pipeline 10*a* to accomplish an add function on the partial resultants from pipeline 10, as heretofore described. The partial resultants formed by the pipeline 10*a* are:

$A_1 . B_1+A_3 . B_3+A_5 . B_5 \ldots +A_n . B_m$, and $A_2 . B_2+A_4 . B_4+A_6 . B_6 \ldots +A_{n-1} . B_{m-1}$.

The partial resultants are thereafter aligned for the final add function to accomplish the final result, as heretofore described.

INTERVAL

An interval function is designed to accomplish:

$C_1 = A_1$ $C_2 = A_1+B_1$ $C_3 = A_1+2B_1$ $C_4 = A_1+3B_1$ $C_n = A_1+(n-1)B_1$

As heretofore explained in connection with the sum function, adder 11 and 11*a* operate more slowly than the incoming rate of operands. The interval operation may be thought of as three distinct operations: one for establishing a predetermined multiple function of the initial B operand (e.g. $4B_1$) in pipeline 10, one for establishing a chain of initial partial resultants in pipeline 10*a*, and one for merging the results of pipelines 10 and 10*a* to continue to stream the partial resultants from pipeline 10*a*.

In the first phase of the operation, the $B_1$ operand is introduced via channel 17 to pipeline 10. Assuming, for example, the pipeline 10 may be capable of performing an add function in one-fourth the rate of inputted operands, it is evident that adder 11 will be functioning on four different add functions at any one time. Initially, the $B_1$ operand may be forwarded into the adder, circulated therethrough, and applied through gate 26 to adder 11. $B_1$ on channel 14 is thereafter added to $B_1$ on channel 15 and the result is circulated through the adder 11 to derive a $2B_1$ output. This is forwarded back to gates 16 and 26 and the two $2B_1$'s are added together to derive a $4B_1$ output. Thereafter, the $4B_1$ output is circulated through gate 16 while a machine zero is applied to gate 26 so that further parital resultants from pipeline 10 will be representative of $4B_1$.

Meanwhile, in pipeline 10*a*, $B_1$ is applied through both gates 16*a* and 26*a* to derive $2B_1$. During the next iteration, machine zero is applied to both gates 16*a* and 26*a* so that the first two iterations appearing in ADD circuit 11a are $2B_1$ and machine zero. During the next iteration, $B_1$ is applied to gate 16a and machine zero is applied to gate 26*a* with the result being that commencement of adding $B_1$ to zero is accomplished. Thus, during the third iteration within adder 11a, the sequence is machine zero, $2B_1$, machine zero, $B_1$. During the fourth iteration, $B_1$ is applied to both channels 14*a* and 15*a* so that the contents of adder 11*a* appear as $2B_1$, machine zero, $B_1$, $2B_1$. The forward $2B_1$ partial resultant is forwarded back through gate 26*a* and $B_1$ is applied to gate 16*a* so that during the fifth iteration, adder 11*a* contains machine zero, $B_1$, $2B_1$, $3B_1$.

The third phase of the operation is now ready to commence. $A_1$ is applied through gate 16*a* to adder 11*a*. Meanwhile, machine zero is forwarded from pipeline 10*a* to gate 26*a* and added to $A_1$. Thus, the contents of adder 11*a* now appear as $B_1$, $2B_1$, $3B_1$, $A_1$. The $B_1$ output from adder 11a is forwarded from pipeline 10*a* to gate 26*a*. $A_1$ is continuously applied to the adder via channel 15*a* so that during the next iteration $A_1$ and $B_1$ are added together. Therefore, during the sixth iteration, the adder will contain 2B, 3B, $A_1$, $A_1+B_1$. $2B_1$ is then forwarded back to be added to $A_1$ so that adder 11a contains $3B_1$, $A_1$, $A_1+B_1$, $A_1+2B_1$. Similarly, the next cycle will produce $A_1$, $A_1+B_1$ , $A_1+2B_1$, $A_1+3B_1$. Thereafter, the $A_1$ inputs are discontinued and the partial resultants from pipeline 10*a* are forwarded to gate 26*a* while gate 16*a* is operated. so that the $4B_1$ partial resultant from pipeline 10 is forwarded via channel 22 to gate 16*a*. Therefore, subsequent iterations are obtained by adding the output from pipeline 10*a* as applied through gate 26*a* and the $4B_1$ partial resultant from pipeline 10 supplied via gate 16*a*. The output is also taken via channel 21*a* to the buffer streaming apparatus to develop the final resultant vector.

From the foregoing examples, it is evident that the present invention provides apparatus for controlling a pipeline arithmetic unit to handle vectors in optimum fashion. Other variations will become more apparent to those familiar with the art. For example, a multiply function may be accomplished, or suitable functions utilizing a divider may be accomplished. Further, for a more thorough description of a suitable divider for use in pipelines 10 and 10*a*, reference may be had to U.S. Pat. No. 3,733,477 granted May 15, 1973 to D. P. Tate and L. K. Steiner for "Iterative Binary Divider Utilizing Multiples Of The Divisor."

This invention is not to be limited by the embodiment shown in the drawings and described in the description, which is given by way of example and not of limitation, but only in accordance with the scope of the appended claims.

What is claimed is:

1. Apparatus for controlling first and second arithmetic pipelines in a computer, wherein said first pipeline includes first and second inputs and a first output and first arithmetic means connected between said first and second inputs and said first output, and wherein said second pipeline includes third and fourth inputs and a second output and second arithmetic means connected between said third and fourth inputs and said second output, each of said first and second arithmetic means accomplishing arithmetic operations on operands appearing at respective ones of said first, second, third and fourth inputs to derive respective resultants, said operands being arranged in a plurality of continuous streams, each stream forming a respective operand vector, said apparatus comprising:

first gate means connected to said first input and having fifth, sixth and seventh inputs for selectively processing data appearing at a selected one of said fifth, sixth and seventh inputs to said first input;

second gate means connected to said second input and having eighth, ninth and tenth inputs for selectively processing data appearing at a selected one of said eighth, ninth and tenth inputs to said second input;

third gate means connected to said third input and having eleventh, twelfth and thirteenth inputs for selectively processing data appearing at a selected one of said eleventh, twelfth and thirteenth inputs to said third input;

fourth gate means connected to said fourth input and having fourteenth, fiftennth, sixteenth and seventeenth inputs for selectively processing data appearing at a selected one of said fourteenth, fifteenth, sixteenth and seventeenth inputs to said fourth input;

means connecting said fifth, eighth and seventeenth inputs to said first output to receive data from said first pipeline;

means connecting said sixth and twelfth inputs to a source of one of said operand vectors;

means connecting said seventh, tenth, thirteenth and sixteenth inputs to a source of data representative of a zero value;

means connecting said ninth and fifteenth inputs to a source of a second of said operand vectors;

means connecting said eleventh and fourteenth inputs to said second output to receive data from said second pipeline; and control means for selectively operating said first, second, third and fourth gate means to selectively process data and operands appearing at selected inputs of said first, second, third and fourth gate means to respective first, second, third and fourth inputs of said respective first and second pipelines.

2. Apparatus according to claim 1 further including second control means for selectively operating said first and second arithmetic means to accomplish respective predetermined arithmetic functions on data and operands appearing at the respective first, second, third and fourth inputs.

3. Apparatus according to claim 2 further including fifth gate means having an input connected to said first output and having an output connected to said seventeenth input, said fifth gate means being selectively operable by said first-named control means to process data from said first output to said seventeenth input.

4. Apparatus according to claim 1 further including fifth gate means having an input connected to said first output and having an output connected to said seventeenth input, said fifth gate means being selectively operable by said control means to process data from said first output to said seventeenth input.

* * * * *